US010905285B2

(12) United States Patent
Zakowski

(10) Patent No.: US 10,905,285 B2
(45) Date of Patent: Feb. 2, 2021

(54) FOOD PROCESSOR HAVING INTEGRATED SPATULA

(71) Applicant: CONAIR CORPORATION, Stamford, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 280 days.

(21) Appl. No.: 14/246,480

(22) Filed: Apr. 7, 2014

(65) Prior Publication Data
US 2014/0299701 A1  Oct. 9, 2014

Related U.S. Application Data

(60) Provisional application No. 61/809,494, filed on Apr. 8, 2013.

(51) Int. Cl.
A47J 43/07 (2006.01)
(52) U.S. Cl.
CPC ................. *A47J 43/0716* (2013.01)
(58) Field of Classification Search
CPC .................................... A47J 43/0716
USPC ....................................... 241/166
See application file for complete search history.

(56) References Cited

U.S. PATENT DOCUMENTS

| 3,415,497 A * | 12/1968 | Johnson | A47J 43/04 15/236.01 |
| 3,504,391 A * | 4/1970 | McCarty | A47J 43/288 15/236.07 |
| 4,863,278 A * | 9/1989 | Otto | A47J 43/046 241/282.2 |
| 5,044,763 A * | 9/1991 | Otto | A21C 1/141 366/309 |
| 5,383,613 A * | 1/1995 | Sundquist | A47J 43/0705 241/166 |
| 6,079,314 A * | 6/2000 | Mackinnon | A47J 31/60 99/289 R |
| 6,935,767 B2 * | 8/2005 | Nikkhah | A47J 43/042 366/129 |
| 7,278,779 B2 * | 10/2007 | Beesley | A47J 43/06 366/192 |
| 2010/0050886 A1 * | 3/2010 | Obersteiner | A47J 19/027 99/507 |
| 2012/0294108 A1 * | 11/2012 | Dickson, Jr. | A47J 43/046 366/205 |

OTHER PUBLICATIONS

Walmart.com sales website, archived Nov. 29, 2012, with additional pictures.*

(Continued)

*Primary Examiner* — Gregory D Swiatocha
(74) *Attorney, Agent, or Firm* — Grogan, Tuccillo & Vanderleeden, LLP

(57) ABSTRACT

A food processor having an integrated spatula is provided. The food processor includes a work bowl and a lid configured to be selectively removable therefrom. The food processor further includes a spatula having a wiper in contact with interior walls of the work bowl and a lever coupled to the wiper and accessible above the lid for manually rotating the wiper within the bowl to scrape the interior walls of the bowl.

4 Claims, 3 Drawing Sheets

(56) References Cited

OTHER PUBLICATIONS

Amazon.com sales website, p. 1 and 3 (First availabele at Amazon.com Nov. 9, 2012).*
CNET Review Published Feb. 6, 2013.*
Hamilton Beach Food Processor Instructions, Dated Mar. 20, 2012.*

* cited by examiner

FOOD PROCESSOR HAVING INTEGRATED SPATULA

CROSS-REFERENCE TO RELATED APPLICATIONS

This application claims the benefit of U.S. Provisional Application Ser. No. 61/809,494, filed on Apr. 8, 2013, which is herein incorporated by reference in its entirety.

FIELD OF THE INVENTION

The present invention relates to food processors and, more particularly, to a food processor having an integrated spatula.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and expanded functionality. In particular, a limitation of existing food processing devices is that they must be turned off and a cover removed from the bowl in order for a user to scrape food items from the sides of the bowl to ensure complete processing.

SUMMARY OF THE INVENTION

It is an object of the present invention to provide a food processor having an integrated spatula.

It is another object of the present invention to provide a food processor having an integrated spatula that allows a user to wipe the inner walls of the food processor bowl without opening the lid.

It is another object of the present invention to provide a food processor having an integrated spatula that allows a user to wipe the inner walls of the food processor bowl during processing.

These and other objects are achieved by the present invention.

According to an embodiment of the present invention, a food processor having an integrated spatula is provided. The food processor includes a work bowl and a lid configured to be selectively removable therefrom. The food processor further includes a spatula having a wiper in contact with interior walls of the work bowl and a lever coupled to the wiper and accessible above the lid for manually rotating the wiper within the bowl to scape the interior walls of the bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
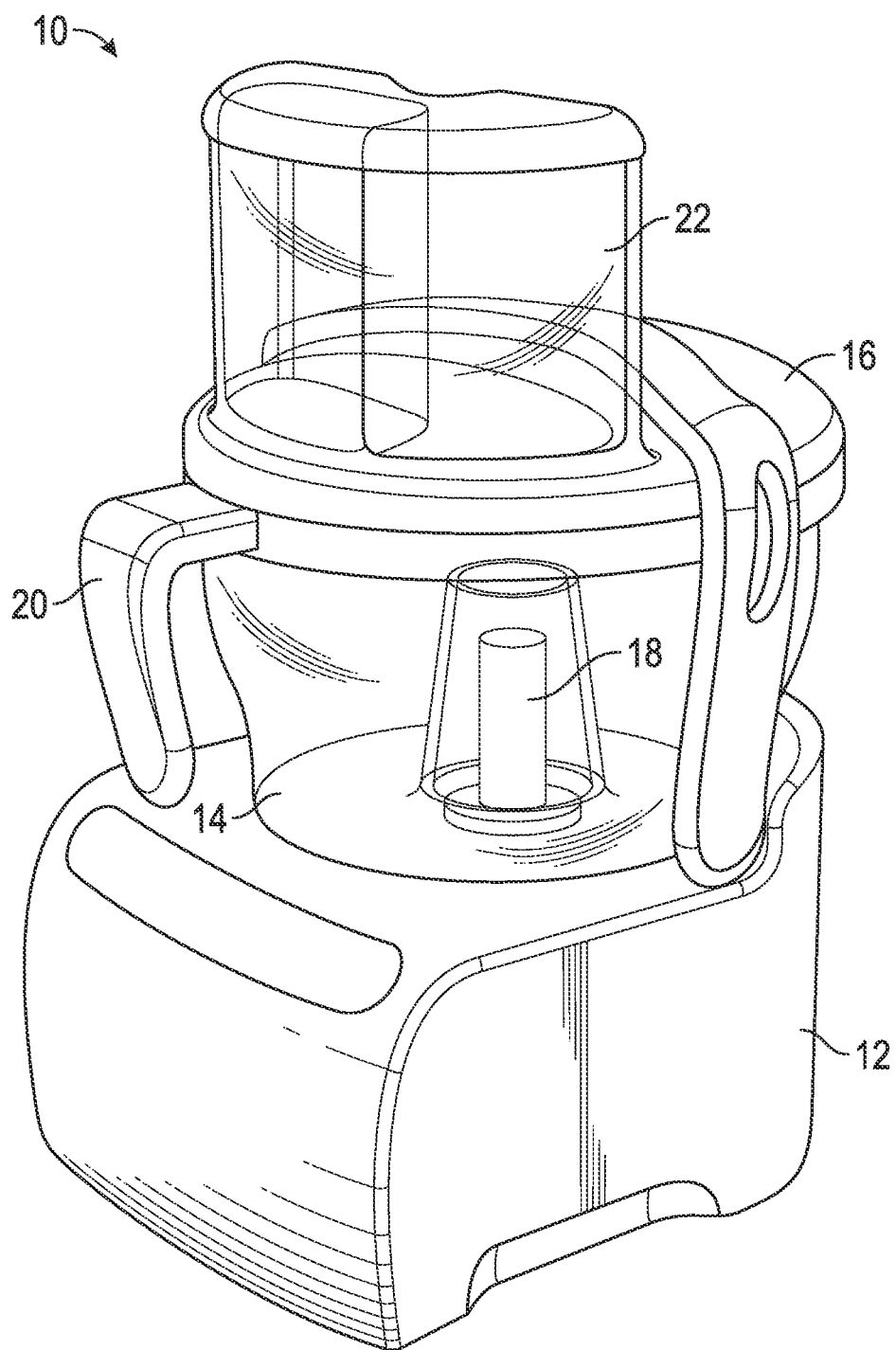
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
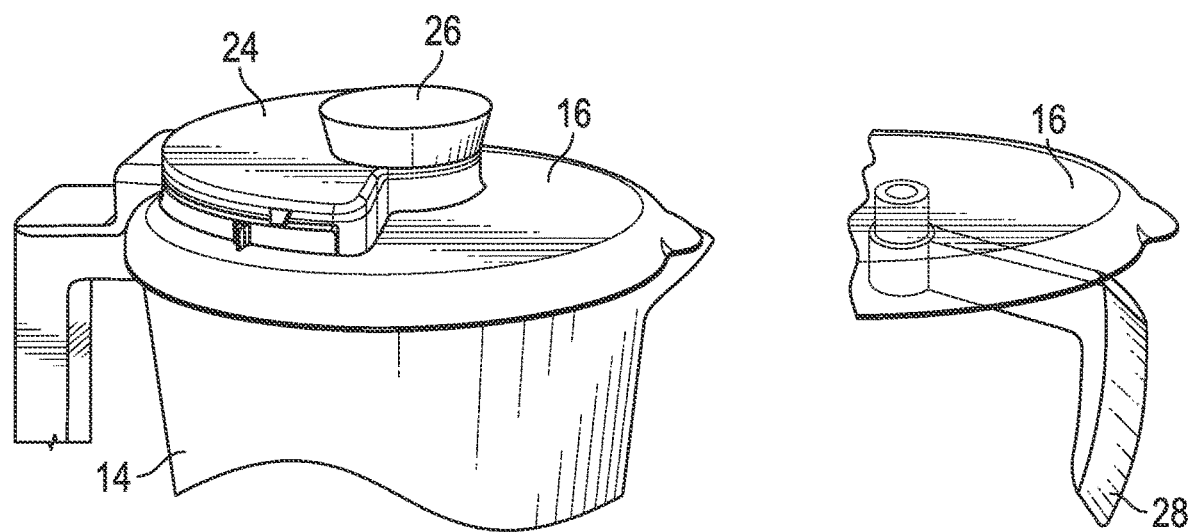
FIG. 2 is a perspective view of a lid and spatula of the food processor of FIG. 1 according to an embodiment of the present invention.

Turning now to FIG. 2, the feed tube 22 may be removable from the lid 16 and a cover 24 may be utilized to cover the feed tube opening. As shown therein, the cover 24 may include a knob 26 to which a spatula 28 may be coupled. The spatula 28 may be rotated within the bowl by twisting the knob 26.

Figure 3:
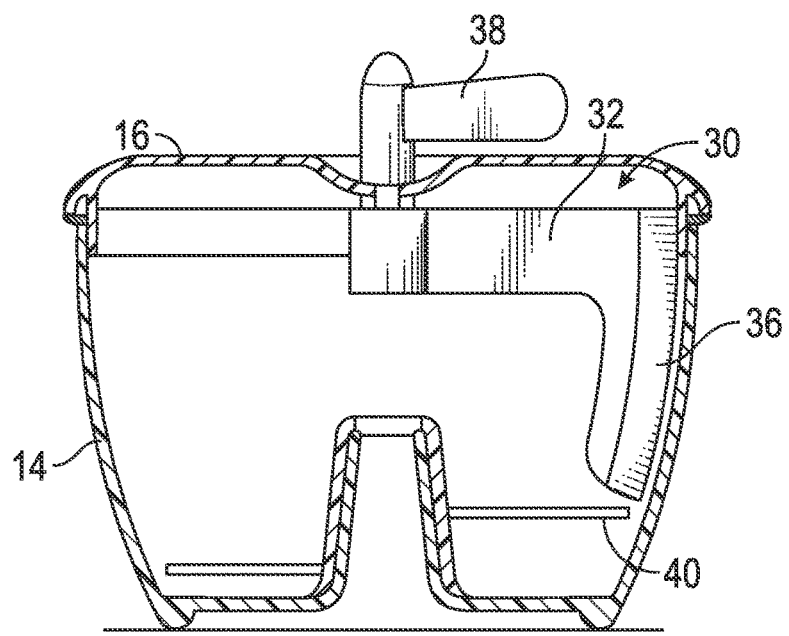
FIG. 3 is a side elevational view of a food processor lid and work bowl having an integrated spatula according to an embodiment of the present invention.
Figure 4:
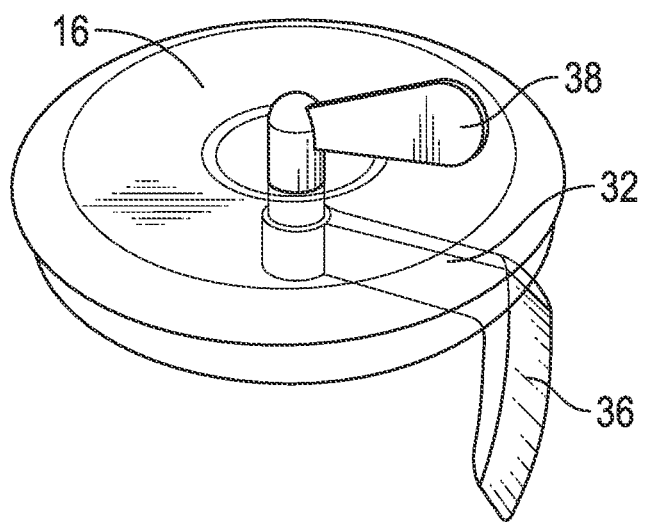
FIG. 4 is a perspective view illustrating the lid and integrated spatula of FIG. 3.
Figure 5:
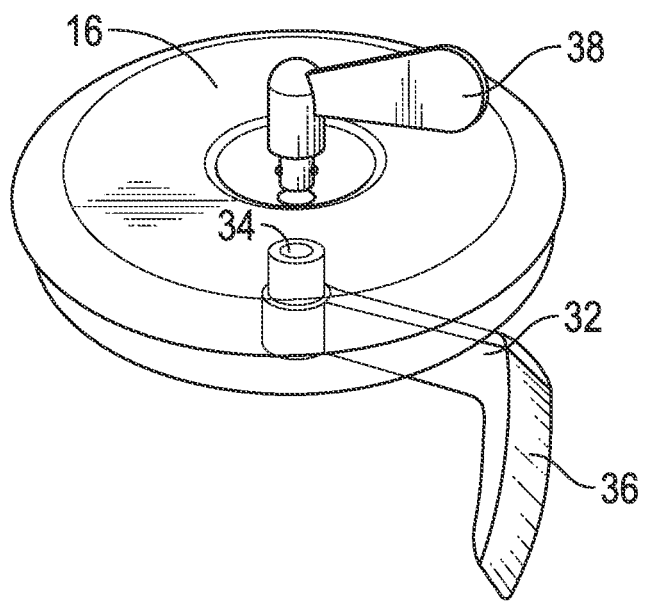
FIG. 5 is another perspective view illustrating the lid and integrated spatula of FIG. 3.

With reference to FIGS. 3-5, an alternative embodiment of an integrated spatula 30 is shown. As shown therein the spatula 30 includes a connecting arm 32 having an aperture 34 therein, and a wiper arm 36. The connecting arm 32 is adapted to mate with a lever 38 that is provided through an aperture in the lid 16 of the work bowl 14. In particular, the connecting arm 32 and the lever 38 are configured to snap together to retain the lid 16 therebetween.

As best shown in FIG. 3, the wiper arm 36 is generally arcuate in shape and is designed to closely follow the curvature of the interior of the work bowl 14 within which it is disposed. In the preferred embodiment, the wiper arm 36 is formed from a resilient material such as rubber or the like, although other materials known in the art may also be utilized without departing from the broader aspects of the present invention. The wiper arm 36, as shown therein, is also angled so as to direct processed food items downward and into blade assembly 40. Importantly, a distal end of the wiper arm, as shown in FIG. 3, terminates just above the upper-most blade of the blade assembly 40, so as not to interfere therewith. In addition, the wiper arm 36 is spring loaded towards the sides of the bowl 14, thereby allowing it to be used with different diameter work bowls.

In operation, a user can grasp lever 38 and rotate the same to effect rotation of the wiper 36 inside the work bowl 14. As will be readily appreciated, this allows a user to wipe the inner walls of the bowl prior to, after, and even during processing without opening the lid 16, and without interfering with the blade assembly 40, thereby providing a functionality heretofore not seen in the art.

In particular, existing food processing devices are cumbersome in that when partially processed, but not fully processed, food items stick to the sides of the work bowl, a user must turn off the device, remove the cover, scrape the sides of the bowl, replace the cover and initiate processing again. This series of steps often must be repeated numerous times to ensure full processing of the food items.

In contrast to this, the integrated spatula 30 of the present invention allows a user scrape the sides of the bowl to ensure complete processing without having to remove the cover or even turn off the device.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor for use with a work bowl, said food processor comprising:
    a base;
    a motor disposed within said base and operatively coupled to a blade assembly;
    a lid for said work bowl, said lid defining an aperture;
    a feed tube for selective and removable communication with said aperture;
    a wiper arm assembly for selective and removable communication with said aperture; and
    wherein said feed tube and said wiper arm assembly may be exchanged with one another to alternatively communicate with said aperture.

2. The food processor for use with a work bowl, according to claim 1, wherein:
    said wiper arm assembly is outwardly biased towards an inner surface of said of work bowl.

3. The food processor for use with a work bowl according to claim 1, wherein:
    said wiper arm assembly extends into said work bowl to a point above said blade assembly.

4. The food processor for use with a work bowl according to claim 1, wherein:
    said wiper arm assembly is spring-biased towards said inner surface of said work bowl.

* * * * *